Jan. 30, 1962    J. E. ROOKUS    3,018,933
FILM PROJECTOR

Filed Jan. 23, 1959    2 Sheets-Sheet 1

INVENTOR.
JAMES E. ROOKUS
BY Price and Heneveld
ATTORNEYS

Jan. 30, 1962  J. E. ROOKUS  3,018,933
FILM PROJECTOR
Filed Jan. 23, 1959  2 Sheets-Sheet 2
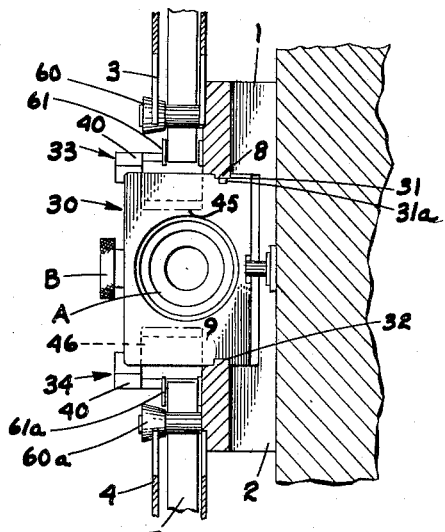
FIG. 4
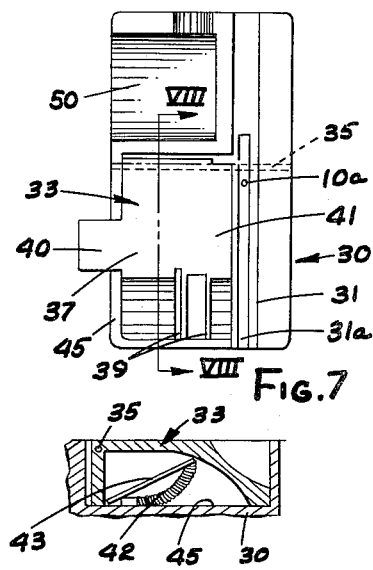
FIG. 7
FIG. 8
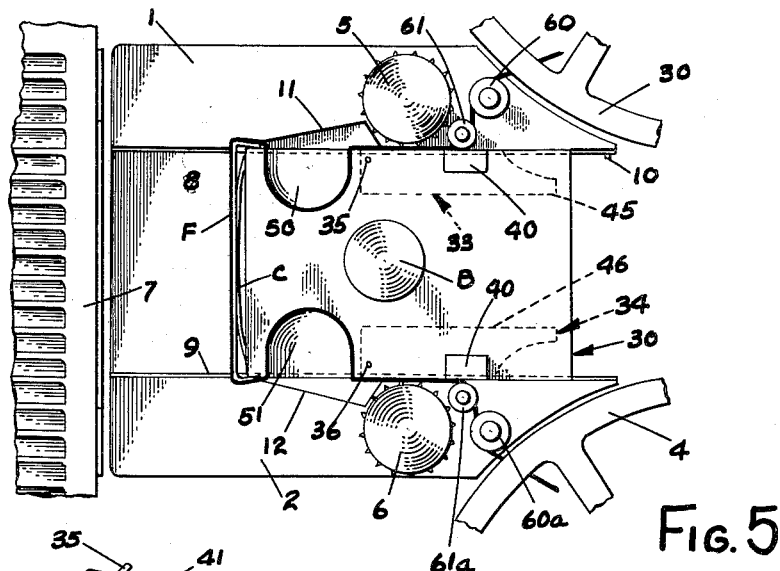
FIG. 5
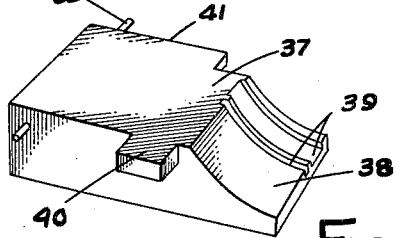
FIG. 6
*INVENTOR.*
JAMES E. ROOKUS
BY
*Price and Heneveld*
ATTORNEYS

United States Patent Office 3,018,933
Patented Jan. 30, 1962

---

3,018,933
FILM PROJECTOR
James E. Rookus, 305 Hillmount Apt., Grand Rapids,
Mich., assignor of five percent to Edward H. Daverman, Grand Rapids, Mich.
Filed Jan. 23, 1959, Ser. No. 788,541
8 Claims. (Cl. 226—76)

This invention relates to an apparatus for threading film in a film projector. More particularly, this invention relates to an apparatus adapted to greatly simplify the threading of film into a projector and to quickly facilitate the forming of loops required to advance the film.

This invention is adapted to be used in conjunction with equipment for advancing a film past a member having an opening therein and a light beam for projecting light through the film and opening to project an enlarged picture on another surface for viewing. In such equipment, the film is advanced intermittently, a pair of shafts being provided, one of which is driven and causes the reel thereon to roll up the film after it has passed the projecting lens. Another reel is mounted for free rotation on the other shaft and from this reel the strip of film is withdrawn by the projector mechanism before the film passes the projection lens.

Apparatus presently in existence includes a number of rollers and cumbersome film clips between the upper and lower shafts to guide it past the projection aperture. To thread the film for projection, one must carefully pass the film through these rollers, over sprockets provided for intermittent advancement of the film and through these cumbersome film clips so that the film is held securely during projection. Since the path traced by the advancing film must include two loops, one loop prior to its passage in front of the light beam and another loop after it has passed in front of the light beam, great care must be exercised to position these loops when threading the film. If the loops are not properly formed, the film will not advance properly and the film is broken quite easily. This threading operation is quite time consuming and difficult. In a projector having a means for stopping the advancement of the film and rewinding it to rerun a particular portion of the film, the present construction of such apparatus multiplies the problems of threading and loop forming.

Various attempts have been made to solve these problems. The complicated, cumbersome mechanical gadgets used to thread the film and form loops therein are expensive and because of the complicated mechanical structure are also unsatisfactory for simple operation. Such mechanical structure with a multiplicity of moving, interconnected parts inherently causes difficulty.

This application is a continuation-in-part of my copending application Serial No. 717,414, filed February 25, 1958, now abandoned. An object of this invention is to provide apparatus adapted to work in conjunction with standard motion picture projectors, simplifying and facilitating the threading of film in such projectors. A further object of this invention is to provide such apparatus which is simple in construction, thus easy to fabricate and therefore relatively inexpensive.

A further object of this invention is to provide such apparatus which has a minimum of working parts, thereby making it easy to operate and maintain.

Another object of this invention is to provide apparatus of the type described which is especially adapted to facilitate the forming of loops in the film for advancement in the projector.

Still another object of this invention is to provide apparatus so constructed that film breakage is minimized.

A still further object of this invention is to provide apparatus as described which greatly facilitates the rewinding of the film and the reshowing of various parts of the film.

Other objects of this invention will become obvious to those skilled in the art of motion picture projectors upon reading the following specification in conjunction with the accompanying drawings wherein:

FIG. 4 is a cross sectional view taken along the plane IV—IV of FIG. 1.

FIG. 5 is a side view of the apparatus comprising this invention, positioned for forming loops in the film.

FIG. 6 is a top, perspective view of one of the engaging supports utilized in this invention.

FIG. 7 is a plan view of the movable member shown in FIGS. 1–5.

FIG. 8 is a cross sectional view taken along the plane VIII—VIII of FIG. 7.

Briefly, this invention relates to an apparatus for threading film and forming loops therein in a motion picture projector of a type having a pair of sprockets for intermittent advancement of the film, the sprockets lying generally one above the other. A movable member is mounted on the projector, this member being movable in a generally horizontal direction between the sprockets. This member is adapted in a first position to provide engagement of the film with the sprockets for intermittent advancement of the film and in a second position to release the film from this engagement. Film receiving pockets are provided in the member, these pockets lying generally transversely to the direction of movement, whereby film may be pressed into these pockets with one's fingers when the member is in the second position, to form loops in the film upon release after the member is moved to its first position.

Figure 1:
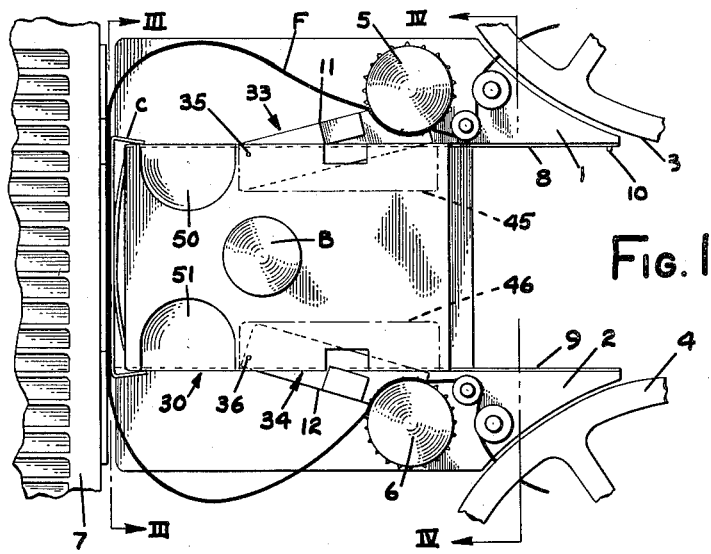
FIG. 1 is a side view of the apparatus comprising this invention, the film positioned for advancement.

Referring more specifically to the drawings, the reference numeral 30 designates a movable member, slidable within the stationary guides 1 and 2 (FIG. 1). These stationary guides are mounted on a projector to lie between the rotating film storage reels 3 and 4 (portions thereof being shown), facilitating movement of the member 30 between these reels. A pair of sprockets 5 and 6 are positioned respectively above and below the slidable member 30, these sprockets being a conventional means for providing intermittent advancement of the film past a projectioned light beam. The housing for the source of such a beam is designated by the reference numeral 7. It must be understood that the stationary guides 1 and 2 may be made an integral part of a projector unit, the guides being shown mounted to a projector merely for purposes of description.

Figure 2:
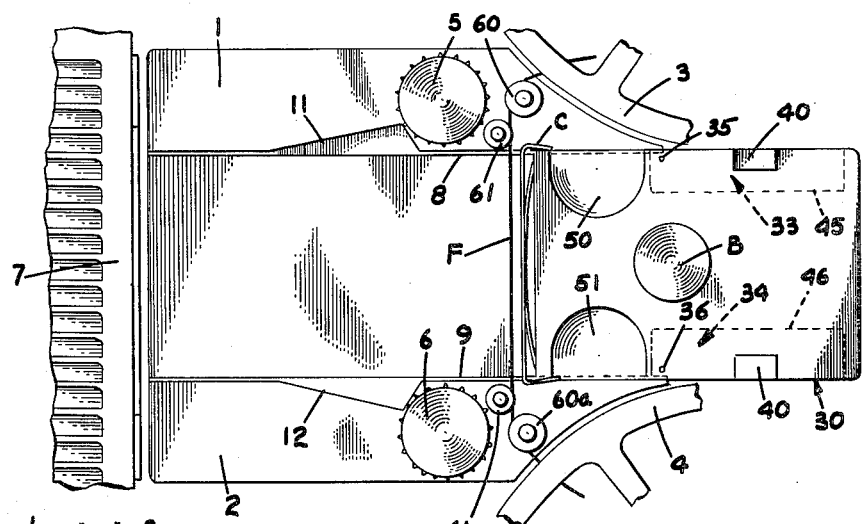
FIG. 2 is a side view of the apparatus comprising this invention, positioned for threading or rewinding of the film.
Figure 3:
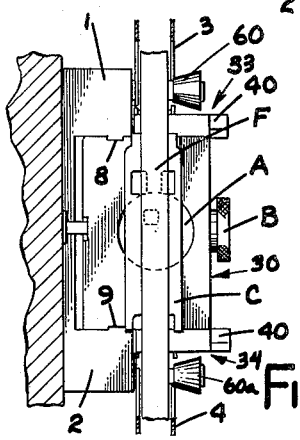
FIG. 3 is a cross section along the plane III—III of FIG. 1.

The stationary guides 1 and 2 each include the respective tongues 8 and 9 extending throughout their length (FIGS. 2 and 3). The tongues 8 and 9 are received in and occupy the top groove 31 and the bottom groove 32 of the member 30 (FIGS. 4 and 7). This facilitates movement of the member 30 between guides 1 and 2 and assures proper tracking. A small groove 31a is positioned in the floor of the top groove 31, this groove receiving the small knob 10 positioned at the outer end of the upper stationary guide 1 (FIG. 5). The knob 10 of stationary guide 1 rides in groove 31a, and limits the outward movement of the member 30 when it strikes the knob 10a (FIG. 7) positioned within groove 31a.

The slidable member 30 includes a pair of spring biased film supports 33 and 34 mounted respectively in the top and bottom of the member. These film supports are pivotally mounted on the shafts 35 and 36 (FIGS. 1 and 2) these shafts extending all the way through the movable member 30. Each film support (FIG. 6) includes a main body 37, one end 38 thereof being shaped to the configuration of the sprocket wheels. The sprocket wheels and film are adapted to ride in the grooves 39 positioned in this end of the main body. A gripping tab 40 extends from one end of the main body 37, and a ledge 41 extends from the other side of the body, the purpose of which will be explained more fully hereinafter.

A pair of recesses 45 and 46 at the top and bottom of the movable member 30 receive the main bodies 37 of the film supports 33 and 34 respectively when they are retracted (FIGS. 1, 2 and 5). The shafts 35 and 36 extend through the movable member 30 and the film supports 33 and 34, pivotally securing them to the member 30. The recesses 45 and 46 are shaped to the configuration of the top and bottom film supports 33 and 34, enabling these film supports to lie within the movable member 30 and generally flush with its top and bottom edges (FIGS. 2 and 7). Both film supports are hollowed out to receive a coil spring 42 therein (FIG. 8). A lever member 43 within each film support is operably connected to one end of the coil spring and the other end of the spring is connected to the floor of each of the recesses 45 and 46 in the movable member 30. This spring mechanism biases the film supports to pivot about shafts 35 and 36 from the movable member.

It has already been noted that the movable member 30 is adapted to slide between the upper guide 1 and the lower guide 2. Positioned on the outer sides of these guides are a pair of indentations 11 and 12 respectively (FIGS. 1, 2 and 5). It will now be noted that when the movable member 30 is moved to the right, as shown in FIG. 2, the ledge 41 of each film support will be supressed by the upper and lower guides. However, as the movable member 30 is moved to the left, as shown in FIG. 1, these ledges 41 are free to spring into the indentations 11 and 12 in the upper and lower guides. The movable member is then rigidly held in a stationary position and in this position provides engagement between the film F and the sprockets 5 and 6 for intermittent movement of the film (FIG. 1). However, upon depressing the tabs 40 of the film supports, the movable member can then again be moved to the right.

Positioned transversely to the direction of movement of the member 30, are a pair of shaped recesses 50 and 52 (FIGS. 1, 2 and 5). These recesses open through the side of the movable member 30, the purpose of which is to provide a means for moving the member 30 and forming loops in the film. These recesses are shown to be shaped such that the user's thumb and forefinger easily fit therein. However, it will be understood that the principles of this invention could be practiced if there were a single elongated recess at the side of the movable member. In the embodiment of the invention shown, the user's thumb and forefinger can be placed in these recesses 50 and 51 in order to facilitate movement of the member 30.

In FIG. 5 the movable member 30 is shown midway between its two positions. In this middle position, when the finger and thumb are placed in the recesses 50 and 51, the film F may also be drawn into these recesses. It will then be obvious that when the movable member 30 is moved to the left, film will be drawn from the reels 4 and 5 and loops will be formed in the film upon removing the thumb and forefinger from these recesses.

A pair of rollers 60 and 61 are positioned between the upper reel 3 and the upper sprocket 5 in the upper guide 1. A similar set of rollers 60a and 61a are positioned in the bottom guide 2. These rollers are adapted to support and guide the film F as shown in FIG. 2 assuring its proper tracking on the drive sprockets 5 and 6. It will be noted that an adjustable lens A (FIG. 4) may be positioned within the movable member 30, having a focus adjustment knob B (FIG. 1) at the side of the movable member. A film guide C is positioned on the other side of the movable member 30 (FIG. 3) for guiding the film, holding it normal to the light beam and in the proper position for correct focus.

Assembly and operation

The upper and lower guides 1 and 2 are mounted on the sides of a standard projector. As noted previously, these guides could be designed as integral parts of the projector. The movable member 30 with its top and bottom film supports is mounted between these guides by fitting tongue 8 into the top groove 31 and tongue 9 into the bottom groove 32. The movable member is then free to slide between the guides 1 and 2.

When one is threading film, one need merely move member 30 to its extreme right position (FIG. 2) and draw the film over the guide 60, between guide 60 and 61, down between guide 60a and 61a and below roller 61a and on around the lower reel 4. The film is then wrapped a few times on this reel. It will be noted that the movable member 30 permits the film to pass in a straight line from roller 60 to roller 61a because of the movable member's withdrawal from this area. Thus, the initial film threading operation is greatly simplified. The movable member 30 is then moved to the left, drawing the film F with it to the position shown in FIG. 5. By depressing the film between one's thumb and forefinger into the recesses 50 and 51 and moving the movable member to its extreme left position, drawing additional film from each reel, loops will be formed automatically in the film upon releasing the thumb and forefinger from these recesses. In this position, the ledges 41 are biased into the indentations 11 and 12 in the upper and lower guides respectively. The film F is seated within the grooves 39 of the top and bottom film supports. These film supports force the film into engagement with the teeth of the sprockets 4 and 5 for intermittent advancement of the film. Since these film supports are spring biased, the chances of the film breaking are greatly minimized because of the resilient engagement. If fabricated from a material characterized by a low friction or lubricious surface such as nylon or Teflon, a minimum of wear and drag will be imposed on the film. The loops are perfectly formed with a very simple operation.

When one wishes to stop the film and rewind it such as to repeat the projection of a certain portion of the film, one merely depresses the tabs 40 of the film supports 33 and 34, releasing the movable member from its stationary position so that it may be moved to the right. In its extreme right position, the film may be rewound at a high rate of speed, as it merely travels between the rollers 60a and 61a, and 60 and 61 (FIG. 2), not passing over the sprockets. The invention's capacity to quickly reposition the film from the sinuous projection path to the straight rewind path between rollers 60 and 60a is a most important feature of this invention. It permits practically instantaneous change from projection to rewind and vice versa. By straightening the rewind path and eliminating the manipulation required by a complex threading operation, film breakage is all but eliminated. The greatest cause of film damage which leads to film breakage arises out of threading the film through a maze of complex guides and rollers. All this is eliminated.

When the desired amount of rewinding has been completed, one merely returns the movable member 30 to the position shown in FIG. 5. At this point, one depresses the film F into the recesses 50 and 51 of the movable member, and moves it to its extreme left position where, upon release, the loops are again perfectly formed.

The apparatus disclosed herein is extremely simple in fabrication, having a minimum of working parts, thus being inexpensive to fabricate and maintain. The chances for film breakage are greatly minimized. The initial threading of the film is greatly simplified, allowing even a child to easily operate the machine. Loops are formed in the film in such a manner that no mistakes can be made and it is accomplished with one simple hand operation. The proper size of loop is automatically determined by the invention. The use of loops of improper size is another major cause of film damage eliminated by this invention. Because of this simplicity, it is very easy to stop the forward movement of the film, rewind it swiftly and again form loops in the film to allow forward movement.

The novel loop forming pockets comprising a very important part of this invention facilitate the achievement of many desirable results. They enable one to form loops in film in the simplest manner, and they are positive in action as one is assured that proper loops will be formed. Since there are no moving parts involved, the many problems arising from more complicated structures are eliminated. One cannot harm the film when forming loops with this structure. The forming of loops with this structure takes practically no time. Further, the film is at all times exposed for view, not hidden in an enclosure housing complicated mechanism. This is quite important in the event of film trouble.

While one only embodiment of this invention has been shown, it will be obvious that certain other embodiments may be utilized to practice this invention without departing from the spirit and scope thereof. Such other embodiments are to be included unless the accompanying claims expressly state otherwise.

I claim:

1. In a motion picture projector, apparatus for threading film comprising: means for intermittently advancing a film; a slidable member adapted in a first position to provide engagement with said means for intermittent movement of the film and in a second position releasing the film from said engagement; said slidable member having film receiving depressions extending transversely to the direction of its slidable movement, whereby the film may be manually forced into said depressions when said slidable member is in said second position and loops are formed upon release of the force on the film after said slidable member is moved to said first position.

2. In a motion picture projector having a pair of rotating sprockets providing intermittent movement of the film, apparatus for threading film comprising: a slidable member mounted between the sprockets, said member slidable in a direction generally transverse to a line passing through the sprockets; said slidable member adapted in a first position to provide engagement with said sprockets for intermittent movement of the film and in a second position releasing the film from said engagement; a pair of film receiving pockets in said slidable member, said pockets extending transversely to said direction of movement of said slidable member, whereby the film may be manually positioned within said pockets when said slidable member is in said second position and loops are formed upon release of the film after said slidable member is moved to said first position.

3. In a motion picture projector, apparatus for forming loops in the film to be shown comprising: means for intermittently advancing a film; a movable member adapted in a first position to provide engagement with said means for intermittent movement of the film and in a second position releasing the film from said engagement; a cavity in said movable member for manually receiving the film when said movable member is in said second position, whereby release of the film after said movable member is moved to said first position forms loops in the film.

4. In a motion picture projector having a pair of sprockets for intermittent advancement of the film, the sprockets lying generally one above the other, apparatus for threading film and forming loops therein comprising: a movable member slidably mounted on the projector, said member slidable in a generally horizontal direction between the sprockets; said member adapted in a first position to provide engagement of the film with the sprockets for intermittent advancement of the film and in a second position to release the film from said engagement; film receiving pockets in said member, said pockets lying generally transversely to said direction of movement whereby the film may be manually positioned within said pockets when said slidable member is in said second position and loops are formed upon release of the film after said slidable member is moved to said first position; and roller guide means mounted above and below said member for guiding the film between the sprockets and said member.

5. In a motion picture projector having a pair of sprockets for intermittent advancement of the film, the sprockets lying generally one above the other, apparatus for threading film and forming loops therein comprising: a movable member slidably mounted on the projector, said member slidable in a generally horizontal direction between the sprockets; said member adapted in a first position to provide engagement of the film with the sprockets for intermittent advancement of the film and in a second position to release the film from said engagement; yieldingly resistant means mounted in said member at said points of engagement; film receiving pockets in said member, said pockets lying generally transversely to said direction of movement whereby the film may be manually positioned within said pockets when said slidable member is in said second position and loops are formed upon release of the film after said slidable member is moved to said first position; and roller guide means mounted above and below said member for guiding the film between the sprockets and said member.

6. In a motion picture projector having a pair of sprockets for intermittent advancement of the film, the sprockets lying generally one above the other, apparatus for threading film and forming loops therein comprising: a movable member slidably mounted on the projector, said member slidable in a generally horizontal direction between the sprockets; said member adapted in a first position to provide engagement of the film with the sprockets for intermittent advancement of the film and in a second position to release the film from said engagement; a pair of spring biased engaging supports mounted in said member, said supports biased against the sprockets when said member is in said first position; film receiving pockets in said member, said pockets lying generally transversely to said direction of movement whereby the film may be manually positioned within said pockets when said slidable member is in said second position and loops are formed upon release of the film after said slidable member is moved to said first position; and roller guide means mounted above and below said member for guiding the film between the sprockets and said member.

7. In a motion picture projector having a pair of sprockets for intermittent advancement of the film, the sprockets lying generally one above the other, apparatus for threading film and forming loops therein comprising: a movable member slidably mounted on the projector, said member slidable in a generally horizontal direction between the sprockets; said member adapted in a first position to provide engagement of the film with the sprockets for intermittent advancement of the film and in a second position to release the film from said engagement; film receiving pockets in said member, said pockets lying generally transversely to said direction of movement whereby the film may be manually positioned within said pockets when said slidable member is in said second position and loops are formed upon release of the film after said slidable member is moved to said first position; a film guide track secured to one end of said member for guiding the film when said member is in said first position; and roller guide means mounted above and below said member for guiding the film between the sprockets and said member.

8. In a motion picture projector having a pair of sprockets for intermittent advancement of the film, the sprockets lying generally one above the other, apparatus for threading film and forming loops therein comprising: a movable member slidably mounted on the projector, said member slidable in a generally horizontal direction between the sprockets; said member adapted in a first position to provide engagement of the film with the sprockets for intermittent advancement of the film and in a second position to release the film from said engagement; a pair of spring biased engaging supports mounted in said member, said supports biased against the sprockets when said member is in said first position; film receiving pockets in said member, said pockets lying generally transversely to said direction of movement whereby the film may be manually positioned within said pockets when said slidable member is in said second position and loops are formed upon release of the film after said slidable member is moved to said first position; a film guide track secured to one end of said member for guiding the film when said member is in said first position; and roller guide means mounted above and below said member for guiding the film between the sprockets and said member.

References Cited in the file of this patent

UNITED STATES PATENTS

| | | |
|---|---|---|
| 1,865,107 | Howell | June 28, 1932 |
| 2,390,893 | Morgan et al. | Dec. 11, 1945 |
| 2,472,143 | Briskin | June 7, 1949 |

FOREIGN PATENTS

| | | |
|---|---|---|
| 147,579 | Austria | Nov. 10, 1936 |